United States Patent
Matsumoto

(10) Patent No.: US 10,292,221 B2
(45) Date of Patent: May 14, 2019

(54) SOLID-STATE LIGHT SOURCE LIGHTING DEVICE, LUMINAIRE, VEHICLE LAMP, AND TWO-WHEELED VEHICLE

(71) Applicant: Panasonic Intellectual Property Management Co., Ltd., Osaka (JP)

(72) Inventor: Koji Matsumoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 9 days.

(21) Appl. No.: 15/713,624

(22) Filed: Sep. 23, 2017

(65) Prior Publication Data

US 2018/0098393 A1 Apr. 5, 2018

(30) Foreign Application Priority Data

Sep. 30, 2016 (JP) ................. 2016-194694

(51) Int. Cl.
*H05B 33/08* (2006.01)
*B60Q 1/14* (2006.01)
*B62J 6/02* (2006.01)

(52) U.S. Cl.
CPC ......... *H05B 33/083* (2013.01); *B60Q 1/1423* (2013.01); *H05B 33/0815* (2013.01); *B62J 6/02* (2013.01)

(58) Field of Classification Search
CPC .. B60Q 1/0094; B60Q 1/1415; B60Q 1/1423; B60Q 2300/47; H05B 33/0815; H05B 33/0845

USPC ...................................................... 315/77, 82
See application file for complete search history.

(56) References Cited

U.S. PATENT DOCUMENTS

| | | | | |
|---|---|---|---|---|
| 2004/0070987 A1* | 4/2004 | Iwaki | ................. | H05B 33/0809 362/487 |
| 2011/0109244 A1* | 5/2011 | Grajcar | .............. | H05B 33/0827 315/294 |
| 2014/0184080 A1* | 7/2014 | Rybicki | ............. | H05B 33/0845 315/122 |
| 2015/0230302 A1* | 8/2015 | Ito | ...................... | H05B 33/0815 315/77 |

FOREIGN PATENT DOCUMENTS

JP 2014-197495 A 10/2014

* cited by examiner

*Primary Examiner* — Tung X Le
(74) *Attorney, Agent, or Firm* — Renner Otto Boisselle & Sklar, LLP

(57) ABSTRACT

A solid-state light source lighting device includes an adjuster configured to adjust an output current to be output through an output port, and a first switch to be electrically connected in parallel with a second LED of a plurality of solid-state light sources, and a controller configured to turn on and off the first switch. The controller is configured to keep the first switch off while the DC voltage (input voltage) received through the input port is higher than a threshold voltage, and keep the first switch on while the input voltage is lower than or equal to the threshold voltage. The threshold voltage is higher than or equal to a voltage necessary to turn on the plurality of solid-state light sources while the first switch is off.

17 Claims, 6 Drawing Sheets

SOLID-STATE LIGHT SOURCE LIGHTING DEVICE, LUMINAIRE, VEHICLE LAMP, AND TWO-WHEELED VEHICLE

CROSS-REFERENCE TO RELATED APPLICATION

The present application is based upon and claims the benefit of priority of Japanese Patent Application No. 2016-194694, filed on Sep. 30, 2016, the entire contents of which are incorporated herein by reference.

TECHNICAL FIELD

The present disclosure relates to solid-state light source lighting devices, luminaires, vehicle lamps, and two-wheeled vehicles. More particularly, the present disclosure relates to a solid-state light source lighting device for turning on (lighting) a plurality of solid-state light sources, a luminaire including the solid-state light source lighting device and the plurality of solid-state light sources, a vehicle lamp including the luminaire, and a two-wheeled vehicle on which the vehicle lamp is mounted.

BACKGROUND ART

An LED control device disclosed in Document 1 (JP2014-197495A) is exemplified as a conventional solid-state light source lighting device. The LED control device (hereinafter, referred to as "related device") disclosed in Document 1 includes: a low-beam LED array including one or more LEDs (Light Emitting Diodes); a high-beam LED array including two or more LEDs; and a conversion unit configured to supply a drive current to a series circuit of the low-beam LED array and the high-beam LED array. The related device further includes: a control unit configured to control the conversion unit such that a value of the drive current approaches a target value; and a plurality of bypass switches each of which is connected in parallel with a corresponding LED. The conversion unit includes a voltage regulation converter and a current regulation converter. The voltage regulation converter is a DC to DC converter, and is configured to convert an input voltage received from an on-vehicle battery into an intermediate voltage. The current regulation converter is a step-down chopper circuit, and is configured to convert the intermediate voltage into the drive current.

The control unit is configured to turn on (light) all LEDs of the low-beam LED array and the high-beam LED array by turning off all the bypass switches, thereby realizing a high-beam function. The control unit is configured to turn on LEDs of the low-beam LED array alone by turning off bypass switches each of which is connected in parallel with an LED included in the high-beam LED array, thereby realizing a low-beam function.

An input voltage supplied from an on-vehicle battery may drastically vary according to a state of charge of the battery and/or an operating state of a load (such as audio equipment and air conditioner equipped in the vehicle, for example) that receives electricity from the battery. For example, a voltage of a battery that is mounted on an automobile (or two-wheeled vehicle) and has a rated value of 12 V may vary within a range of 9 V to 16 V. The related device is configured to boost the input voltage by use of the voltage regulation converter of the conversion unit, and hence the related device can turn on (light) all the LEDs even when a reduction of the input voltage occurs. Incidentally, further downsizing of a solid-state light emitting device lighting device for use in an automobile (especially two-wheeled vehicle) is desired. However, the related device is required to include two kinds of converters, the step-up/step-down type voltage regulation converter and the current regulation converter, and hence is difficult to be further downsized.

SUMMARY

An object of the present disclosure is to provide a solid-state light source lighting device, a luminaire, a vehicle lamp, and a two-wheeled vehicle, having a reduced size and being capable of turning on a solid-state light source even when a reduction of an input voltage occurs.

A solid-state light source lighting device according to an aspect of the present disclosure includes an input port for receiving a DC voltage, an output port to which a series circuit of a plurality of solid-state light sources is to be electrically connected, and an adjuster configured to adjust an output current to be output through the output port.

The solid-state light source lighting device further includes a switch to be electrically connected in parallel with at least one solid-state light source of the plurality of solid-state light sources, and a controller configured to turn on and off the switch. The controller is configured to keep the switch off while the DC voltage received through the input port is higher than a threshold voltage, and keep the switch on while the DC voltage is lower than or equal to the threshold voltage. The threshold voltage is higher than or equal to a voltage necessary to turn on the plurality of solid-state light sources while the switch is off.

A luminaire according to an aspect of the present disclosure includes the solid-state light source lighting device, and the series circuit of the plurality of solid-state light sources electrically connected to the output port of the solid-state light source lighting device.

A vehicle lamp according to an aspect of the present disclosure includes the luminaire, and a lamp body which holds the plurality of solid-state light sources and is to be mounted on a vehicle body.

A two-wheeled vehicle according to an aspect of the present disclosure includes the vehicle lamp, and a vehicle body on which the lamp body of the vehicle lamp is mounted.

The solid-state light source lighting device, the luminaire, the vehicle lamp, and the two-wheeled vehicle of the present disclosure can offer an advantage of capable of turning on a solid-state light source even when a reduction of an input voltage occurs, with a reduced device size.

BRIEF DESCRIPTION OF THE DRAWINGS

The figures depict one or more implementations in accordance with the present teaching, by way of example only, not by way of limitations. In the figure, like reference numerals refer to the same or similar elements.

DETAILED DESCRIPTION

Hereinafter, a solid-state light source lighting device 1, a luminaire 3, a vehicle lamp 5 and a two-wheeled vehicle 6 according to an embodiment of the present disclosure will be described in detail with reference to the drawings. The solid-state light source lighting device 1 of the below described embodiment is configured to turn on (light) LEDs as the solid-state light source. However, the solid-state light source is not limited to the LED, but may be an organic electroluminescent element, a semiconductor laser, or the like. Note that the below described embodiment is merely one example of embodiments of the present disclosure. The present disclosure is not limited to the following embodiment, but various modifications, in addition to those described herein, may be made depending on design and the like as long as the one or more effects of the present disclosure are provided.

Figure 1:
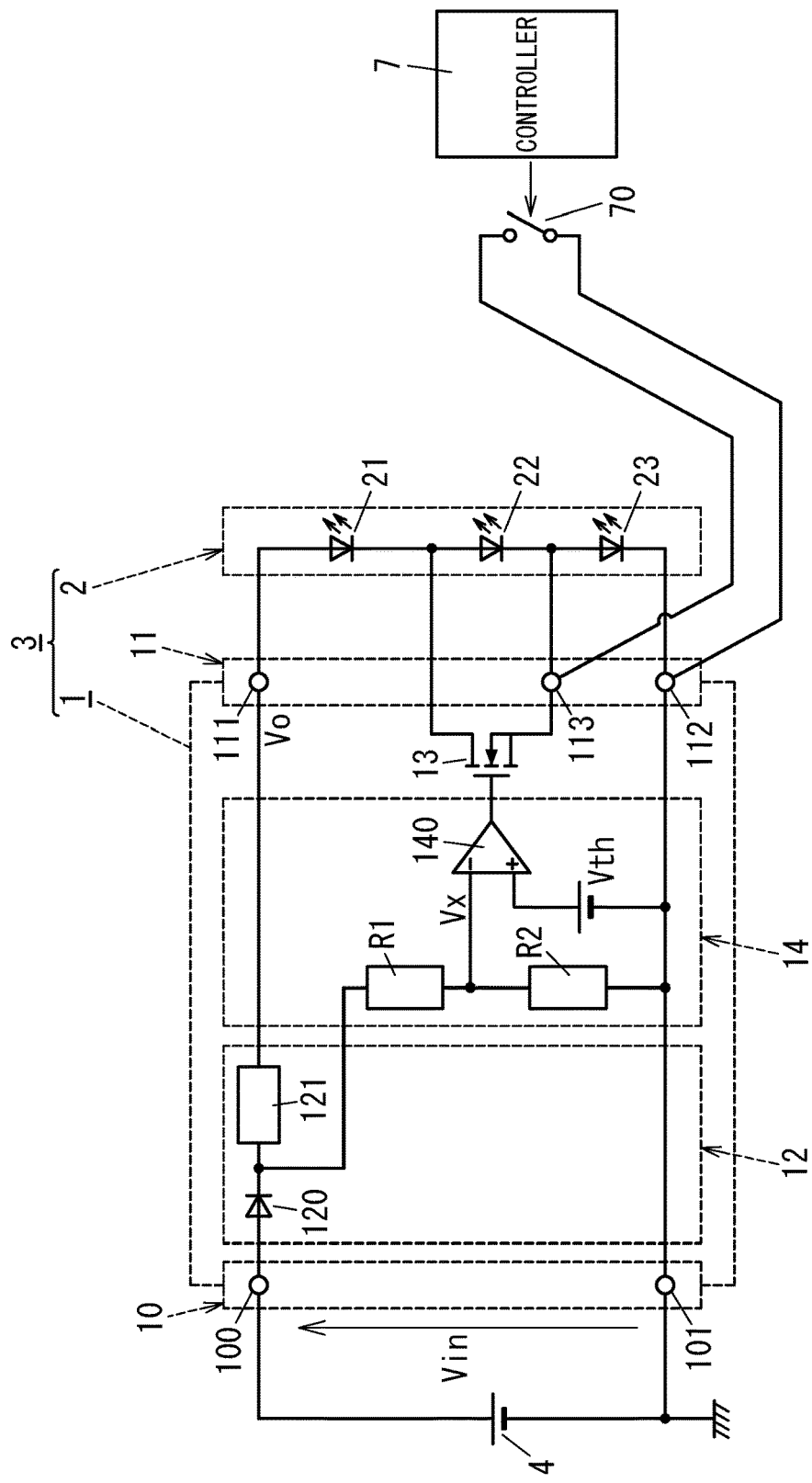
FIG. 1 is a circuit diagram of a solid-state light source lighting device and a luminaire according to an embodiment of the present disclosure.

As shown in FIG. 1, the solid-state light source lighting device 1 includes an input port 10, an output port 11, an adjuster 12, a first switch 13, and a controller 14. Preferably, the input port 10 includes a terminal block or a connector. The input port 10 includes a first input terminal 100 and a second input terminal 101. The first input terminal 100 is electrically connected to a positive electrode of a battery 4. The second input terminal 101 is electrically connected to a negative electrode of the battery 4. Note that the first input terminal 100 and/or the second input terminal 101 may be a land provided on a printed circuit board. Preferably, the negative electrode of the battery 4 is electrically connected to a vehicle body of the two-wheeled vehicle 6 (i.e., is grounded), for example. A rated value of a voltage of the battery 4 is 12 V, for example. However, the voltage of the battery 4 may vary within a range of about 9 V to 16 V.

Preferably, the output port 11 includes a terminal block or a connector. Note that the output port 11 may be lands provided on a printed circuit board. The output port 11 includes a first output terminal 111 and a second output terminal 112. Preferably, the output port 11 further includes a third output terminal 113. The first output terminal 111 is electrically connected to an anode of a first LED 21. The second output terminal 112 is electrically connected to a cathode of a third LED 23. The third output terminal 113 is electrically connected to an anode of the third LED 23 and a cathode of the second LED 22. An anode of the second LED 22 is electrically connected to a cathode of the first LED 21. The third output terminal 113 is electrically connected to a first end of a selection switch 70. The second output terminal 112 is electrically connected to a second end of the selection switch 70. Thus, while the selection switch 70 is on, the third output terminal 113 and the second output terminal 112 are short-circuited (connected) via the selection switch 70 which is on. The selection switch 70 is turned on and off by a controller 7 mounted on the two-wheeled vehicle 6. Hereinafter, a series circuit of the first LED 21, the second LED 22, and the third LED 23 may be referred to as a "light source module 2". Note that the light source module 2 may be a series circuit of two or four or more LEDs.

The adjuster 12 includes a diode 120 for reverse-flow prevention, and a resistor 121 for current limitation. An anode of the diode 120 is electrically connected to the first input terminal 100. A cathode of the diode 120 is electrically connected to a first end of the resistor 121. A second end of the resistor 121 is electrically connected to the first output terminal 111. The adjuster 12 is configured to adjust (limit) a current supplied to a plurality of solid-state light sources (first LED 21, second LED 22, and third LED 23) from the battery 4.

The first switch 13 is an enhancement type N-channel MOSFET (Metal Oxide Semiconductor Field Effect Transformer) for example, but is not limited thereto. Alternatively, the first switch 13 may be a bipolar transistor, a solid state relay, an electromagnetic relay, or the like. A drain (first terminal) of the first switch 13 is electrically connected to the cathode of the first LED 21 and the anode of the second LED 22. A source (second terminal) of the first switch 13 is electrically connected, via the third output terminal 113, to the cathode of the second LED 22 and the anode of the third LED 23.

The controller 14 includes two resistors R1 and R2, and a comparator 140. A first end of the resistor R1 is electrically connected to a cathode of the diode 120. A second end of the resistor R1 is electrically connected to a first end of the resistor R2 and an inverting terminal (minus terminal) of the comparator 140. A second end of the resistor R2 is electrically connected to the second input terminal 101 and the second output terminal 112. With this configuration, the two resistors R1 and R2 divide a DC voltage (input voltage Vin) supplied to the input port 10 to produce a partial voltage (hereinafter referred to as a detection voltage Vx) proportional to the input voltage Vin. The detection voltage Vx equals to a product of the input voltage Vin and a division ratio ($r2/(r1+r2)$), where "r1" denotes a resistance of the resistor R1 and "r2" denotes a resistance of the resistor R2. The detection voltage Vx is supplied to the minus terminal of the comparator 140. A threshold voltage Vth, which is constant, is supplied to a non-inverting terminal (plus terminal) of the comparator 140. The threshold voltage Vth may be supplied from a constant voltage circuit such as a three-terminal regulator, for example. Preferably, the threshold voltage Vth is higher than or equal to a product of the division ratio and a voltage necessary to turn on (light) the first LED 21 to third LED 23 (light source module 2). Specifically, in a case where a rated value of a forward voltage of each of the first LED 21 to the third LED 23 is 3.2 V for example, the threshold voltage Vth is preferably 9.6 V=3.2 V*3 or more. Note that an actual voltage applied across an array of the resistors R1 and R2 is a voltage defined by subtracting a forward voltage (about 0.5 V to 1.5 V) of the diode 120 from the input voltage Vin. Therefore, it is preferable that the threshold voltage Vth is higher than or equal to a product of: the division ratio; and a sum of the voltage (in the above case, 9.6 V) necessary to turn on the light source module 2 and the forward voltage of the diode 120. The comparator 140 is configured to compare the detection voltage Vx with the threshold voltage Vth. While the detection voltage Vx is lower than the threshold voltage Vth, the comparator 140 keeps a signal level of an output signal output through an output terminal thereof a high-level. While the detection voltage Vx is higher than or equal to the threshold voltage Vth, the comparator 140 keeps the signal level of the output signal a low-level. The output terminal of the comparator 140 is electrically connected to a gate (control terminal) of the first switch 13. Hence, the switch 13 is kept off while the output signal of the comparator 140 is the low-level, and the switch 13 is kept on while the output signal of the comparator 140 is the high-level. Hereinafter, a voltage necessary to turn on (light) the light source module 2 is referred to as "lighting enabling voltage" of the light source module 2. The lighting enabling voltage is 9.6 V, for example.

The luminaire 3 of the embodiment includes the solid-state light source lighting device 1 and the plurality of solid-state light sources (light source module 2). The vehicle lamp 5 of the embodiment serves as a head lamp of the two-wheeled vehicle 6 of the embodiment (see FIG. 6). However, the vehicle lamp is not limited to the head lamp of the two-wheeled vehicle, but may be a front fog lamp, a backup lamp, a cornering lamp, a road light, a side light, a tail lamp, a rear fog lamp, a parking lamp, a direction indicator, a sub-direction indicator, a hazard flasher, or the like, for a two-wheeled vehicle, for example.

When an operator (driver) starts an engine of the two-wheeled vehicle 6, the input voltage Vin is applied to the input port 10 from the battery 4. As a result of the application of the voltage of the battery 4 to the input port 10, the diode 120 of the adjuster 12 conducts, so that an output voltage Vo is applied to the output port 11. Note that the light source module 2 can be turned on (to emit light) by the solid-state light source lighting device 1 when the output voltage Vo is higher than the lighting enabling voltage. In the case where the detection voltage Vx is higher than or equal to the threshold voltage Vth, the comparator 140 of the controller 14 outputs the low-level signal to turn off the first switch 13. Accordingly, the second LED 22 as well as the first LED 21 and the third LED 23 are turned on (emit light). Incidentally, when the operator operates a certain operation component equipped on the handle, the selection switch 70 is turned on by the controller 7. As a result, the anode and the cathode of the third LED 23 are short-circuited (connected) through the selection switch 70 which is on, and a current, which flows through the cathode of the second LED 22, flows into the selection switch 70. The third LED 23 is turned off accordingly. In the vehicle lamp 5 of the embodiment, a light beam emitted from the first LED 21 and the second LED 22 serves as a low beam, and a light beam emitted from the third LED 23 serves as a high beam.

In such a device, there is a possibility that drastic reduction of the voltage of the battery 4 compared to the rated value thereof may occur due to deterioration with time of the battery 4, malfunction of a charging device for charging the battery 4, or the like. It will be supposed a case where the input voltage Vin decreases to a voltage lower than the lighting enabling voltage, for example, to 9.0 V. While the selection switch 70 is off in this case, the output voltage Vo becomes lower than the lighting enabling voltage of the light source module 2. The light source module 2 accordingly seems not to be able to emit light (turned off). However, actually, the input voltage Vin decreased to 9.0 V causes the detection voltage Vx to be lower than the threshold voltage Vth, so that the comparator 140 outputs the high-level signal. The high-level signal output from the comparator 140 causes a gate-source voltage of the first switch 13 to be greater than a threshold of the first switch 13 so that the first switch 13 is turned on. Accordingly, the anode and the cathode of the second LED 22 are short-circuited (connected) through the first switch 13 which is on. As a result, the lighting enabling voltage of the light source module 2 is reduced to a voltage (6.4 V) equal to a sum of a rated value of the forward voltage of the first LED 21 and a rated value of the forward voltage of the third LED 23. The output voltage Vo is higher than the (reduced) lighting enabling voltage of the light source module 2, and hence a current flows through the first output terminal 111 of the output port 11, the first LED 21, the first switch 13, the third output terminal 113, the third LED 23, and the second output terminal 112, in this order. Therefore, the first LED 21 and the third LED 23, other than the second LED 22 electrically connected in parallel with the first switch 13, are turned on.

The related device disclosed in Document 1 can turn on all the LEDs even when a reduction of the input voltage occurs, by boosting the input voltage supplied from the battery by way of the step-up/step-down type voltage regulation converter. However, the related device disclosed in Document 1 is required to include the current regulation converter in addition to the step-up/step-down type voltage regulation converter. Therefore, downsizing of the related device disclosed in Document 1 is difficult.

In contrast to this, the solid-state light source lighting device 1 can turn on at least one solid-state light source (first LED 21 and third LED 23) out of the plurality of solid-state light sources even when a reduction of an output voltage Vo (input voltage Vin) occurs, despite the solid-state light source lighting device 1 does not include a voltage increase circuit provided in the related device. The solid-state light source lighting device 1 can offer an advantage of being capable of turning on the solid-state light source(s) (first LED 21, third LED 23) even when a reduction of an input voltage Vin (output voltage Vo) occurs, with a reduced device size (compared to the related device).

Figure 2A:
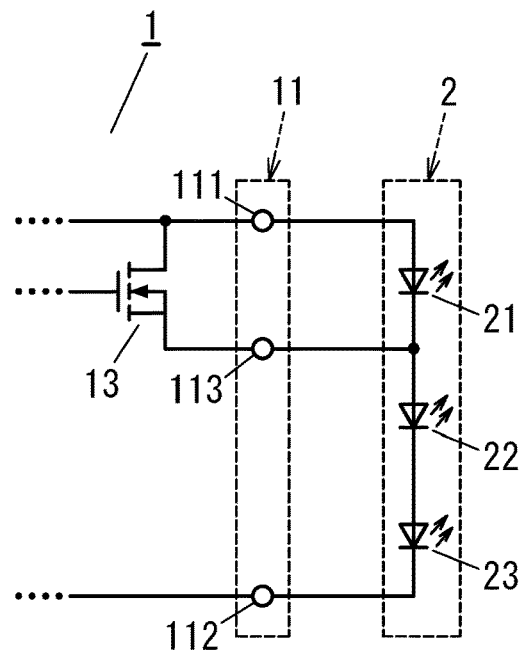
FIG. 2A is a circuit diagram of a main part of a solid-state light source lighting device according to a modification 1 of the embodiment.
Figure 2B:
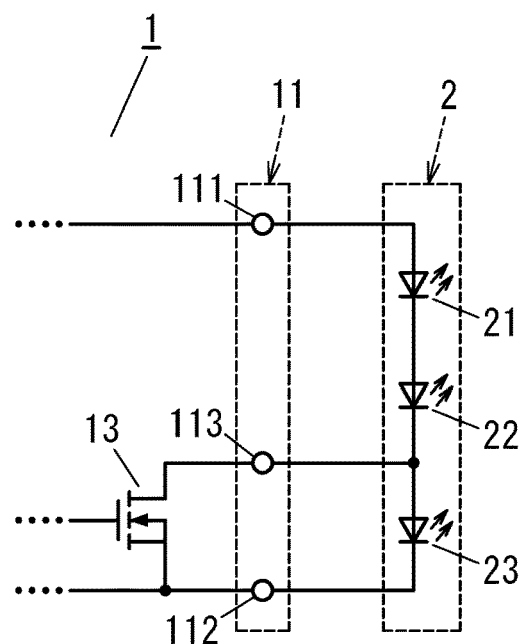
FIG. 2B is a circuit diagram of a main part of a solid-state light source lighting device according to a modification 2 of the embodiment.

According to a modification 1, in a solid-state light source lighting device 1 shown in FIG. 2A, a first switch 13 may be electrically connected in parallel with a first LED 21. According to a modification 2, in a solid-state light source lighting device 1 shown in FIG. 2B, a first switch 13 may be electrically connected in parallel with a third LED 23.

Figure 3A:
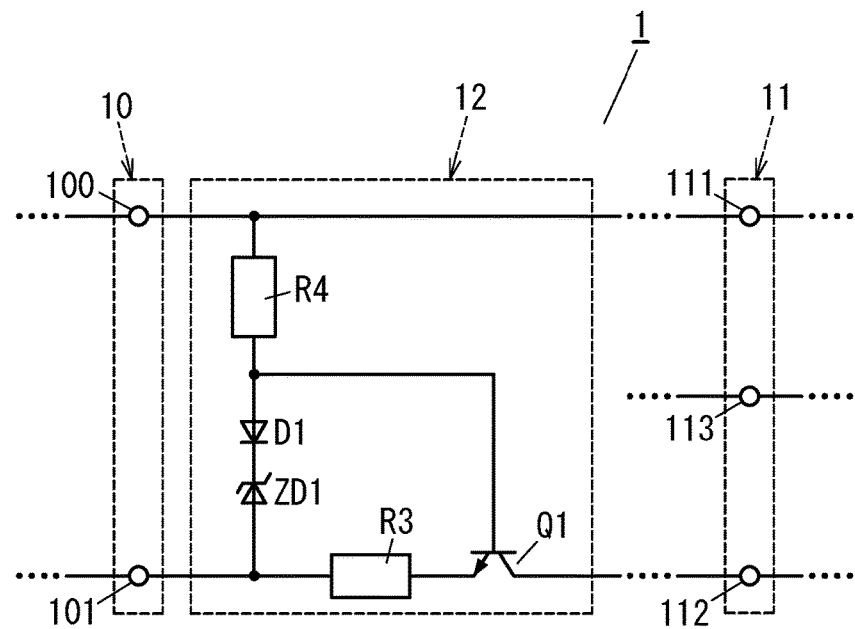
FIG. 3A is a circuit diagram of an adjuster of a solid-state light source lighting device according to a modification 3 of the embodiment.

According to a modification , in a solid-state light source lighting device 1, an adjuster 12 may include a constant current circuit in place of the diode 120 and the resistor 121. As shown in FIG. 3A, the constant current circuit includes an NPN bipolar transistor Q1, two resistors R3 and R4, a diode D1 for temperature compensation, and a zener diode ZD1. A collector of the bipolar transistor Q1 is electrically connected to a second output terminal 112, and an emitter of the bipolar transistor Q1 is electrically connected to a first end of the resistor R3. A base of the bipolar transistor Q1 is electrically connected to a first end of the resistor R4 and an anode of the diode D1. A second end of the resistor R4 is electrically connected to a first input terminal 100 and a first output terminal 111. A cathode of the diode D1 is electrically connected to a cathode of the zener diode ZD1. An anode of the zener diode ZD1 is electrically connected to a second end of the resistor R3 and a second input terminal 101. The constant current circuit (adjuster 12) regulates a current flowing through a light source module 2 to a constant current having a magnitude substantially equivalent to a value defined by dividing a zener voltage of the zener diode ZD1 by a resistance of the resistor R3.

Figure 3B:
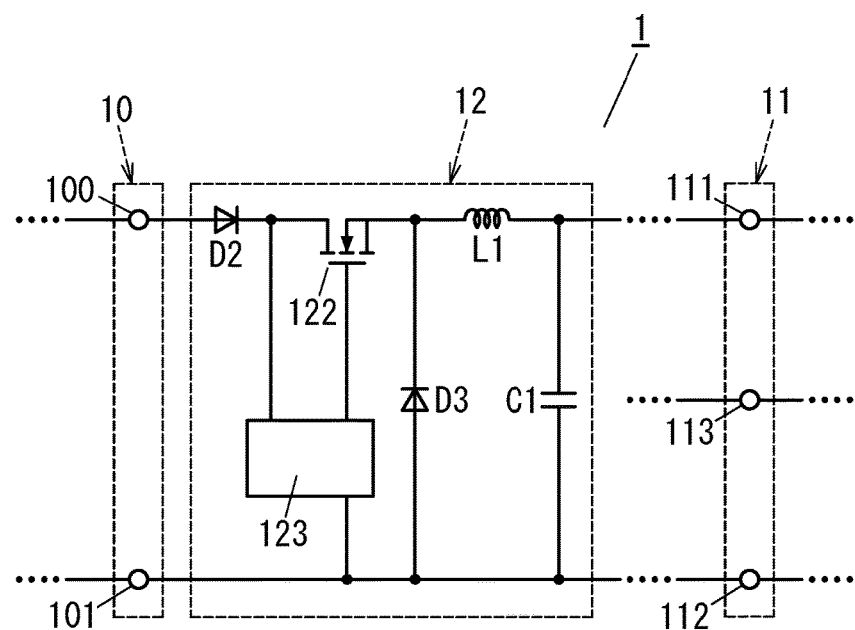
FIG. 3B is a circuit diagram of an adjuster of a solid-state light source lighting device according to a modification 4 of the embodiment.
Figure 4:
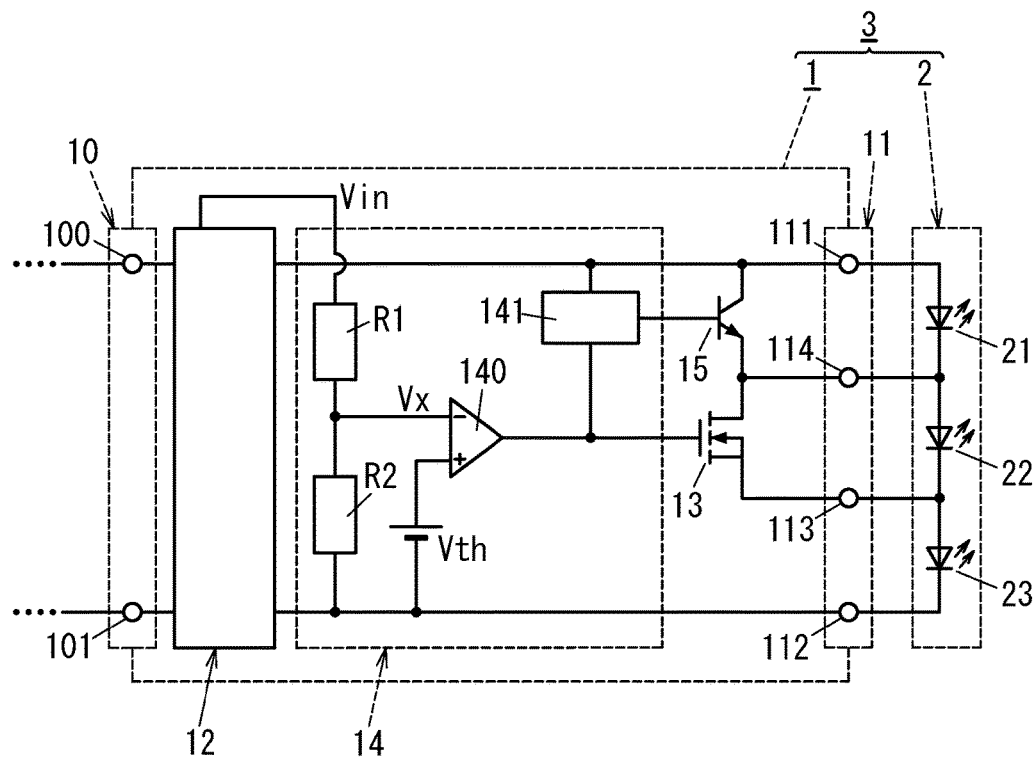
FIG. 4 is a circuit diagram of a solid-state light source lighting device according to a modification 5 of the embodiment.

According to a modification 4, in a solid-state light source lighting device 1, an adjuster 12 may include a step-down type switching regulator circuit (step-down chopper circuit) in place of the diode 120 and the resistor 121. As shown in FIG. 3B, the step-down chopper circuit includes an enhancement type N-channel MOSFET 122, two diodes D2 and D3, an inductor L1, a capacitor C1, and a drive circuit 123. An anode of the diode D2 is electrically connected to a first input terminal 100, and a cathode of the diode D2 is electrically connected to a drain of the MOSFET 122. A source of the MOSFET 122 is electrically connected to a first end of the inductor L1 and a cathode of the diode D3. A second end of the inductor L1 is electrically connected to a first end of the capacitor C1 and a first output terminal 111. A second end of the capacitor C1 is electrically connected to an anode of the diode D3 and a second output terminal 112. The drive circuit 123 is configured to apply a pulsed drive voltage to a gate of the MOSFET 122 to perform switching of (repeatedly turn on and off) the MOSFET 122. The step-down chopper circuit (adjuster 12) controls a duty ratio of the MOSFET 122 according to Pulse-Width Modulation to regulate a drain current of the MOSFET to a constant current According to a modification 5, a solid-state light source lighting device 1 may include, in addition to a first switch 13 electrically connected in parallel with a second LED 22, an additional switch (second switch 15) electrically connected in parallel with a first LED 21, as shown in FIG. 4. The second switch 15 is an NPN bipolar transistor for example, but is not limited thereto. Alternatively, the second switch 15 may be a field effect transistor, a solid state relay, an electromagnetic relay, or the like. A collector of the second switch 15 is electrically connected to a first output terminal 111, and an emitter of the second switch 15 is electrically connected to a drain of the first switch 13 and a fourth output terminal 114. That is, the second switch 15 is electrically connected in series with the first switch 13 to constitute a series circuit connected to the output port 11. The fourth output terminal 114 is electrically connected to a cathode of a first LED 21 and an anode of a second LED 22. The second switch 15 is driven (turned on and off) by a drive circuit 141 included in a controller 14. The drive circuit 141 is configured to turn on the second switch 15 in response to a high-level signal output from a comparator 140 while no current flows from the first output terminal 111 to a light source module 2. The drive circuit 141 is further configured to, after turning on the second switch 15, keep the second switch 15 on until the signal output from the comparator 140 falls down to a low-level.

Therefore, when the light source module 2 fails to emit light (when the output current output from through the output port 11 is smaller than a lower limit) while the first switch 13 is turned on as a result of a detection voltage Vx lower than a threshold voltage Vth, the controller 14 turns on the second switch 15. When both the first switch 13 and the second switch 15 are turned on, a lighting enabling voltage of the light source module 2 is decreased to a voltage (3.2 V) equal to a rated value of a forward voltage of a third LED 23. When the output voltage Vo exceeds the lighting enabling voltage of the light source module 2, a current flows through the second switch 15, the first switch 13, the third output terminal 113, the third LED 23, and the second output terminal 112, in this order. Consequently, the second LED 22 electrically connected in parallel with the first switch 13 and the first LED 21 electrically connected in parallel with the second switch 15 are turned off, respectively, but the third LED 23 is turned off (emits light).

Note that the second switch 15 may be electrically connected in parallel with the third LED 23, instead of the first LED 21. The solid-state light source lighting device 1 may include a third switch, in addition to the first switch 13 and the second switch 15. For example, the first switch 13 may be electrically connected in parallel with the second LED 22, the second switch 15 may be electrically connected in parallel with the first LED 21, and the third switch may be electrically connected in parallel with the third LED 23. In this case, the controller 14 may be configured to, when a reduction of the input voltage Vin (output voltage Vo) occurs, turn on one or two switches of the first switch 13, the second switch 15 and the third switch in turn until a current is caused to flow through the light source module 2 to emit light. Alternatively, the controller 14 may be configured to turn on the third switch, the first switch 13, or the second switch 15 in turn as a decrease in the input voltage Vin.

Figure 5:
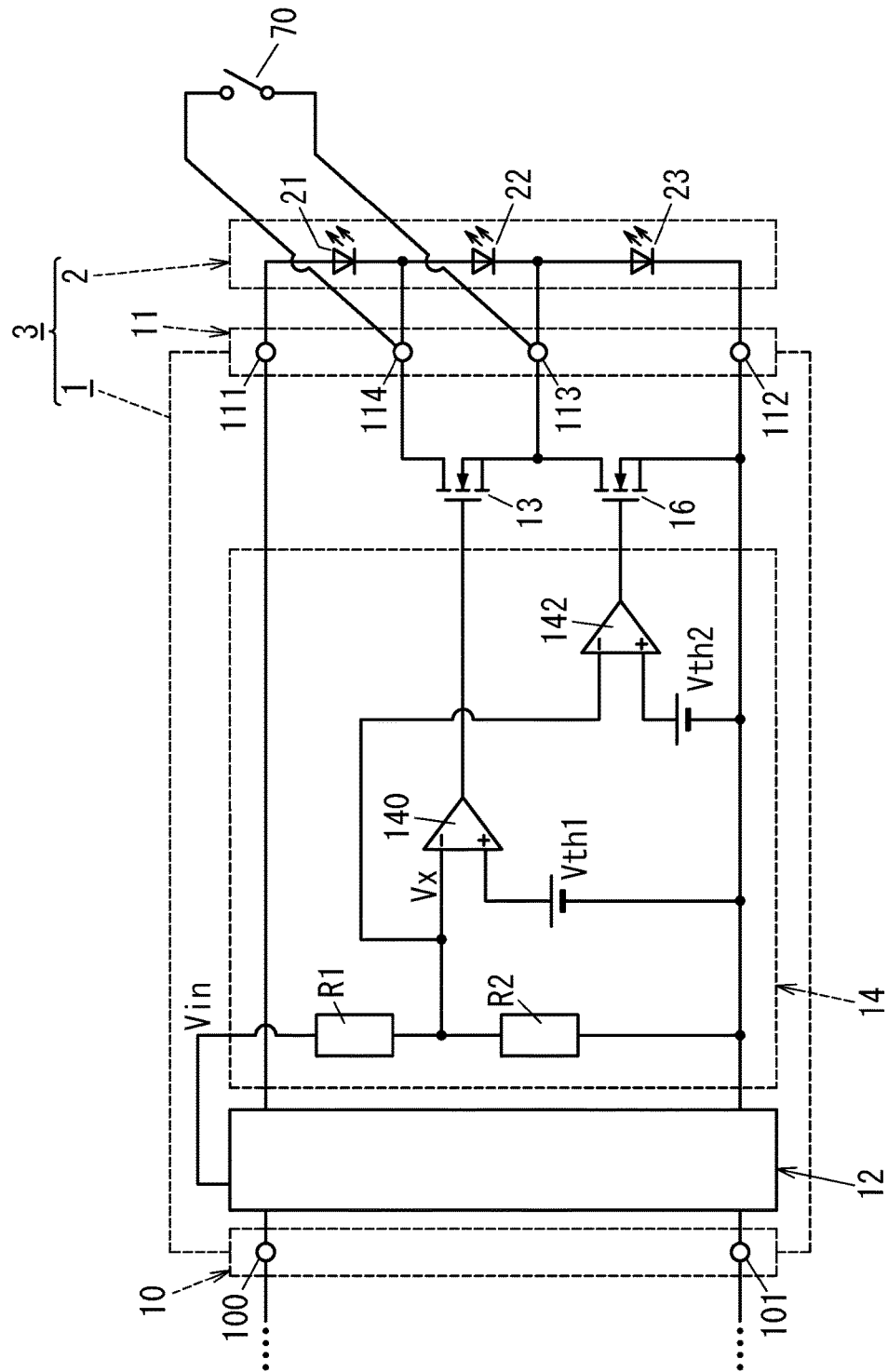
FIG. 5 is a circuit diagram of a solid-state light source lighting device according to a modification 6 of the embodiment.

According to a modification 6 as shown in FIG. 5, a solid-state light source lighting device 1 may include, in addition to a first switch 13 electrically connected in parallel with a second LED 22, an additional switch (third switch 16) electrically connected in parallel with a third LED 23. For example, the third switch 16 may be an enhancement type N-channel MOSFET, but is not limited thereto. Alternatively, the third switch 16 may be a bipolar transistor, a solid state relay, an electromagnetic relay, or the like. A drain of the third switch 16 is electrically connected to a source of the first switch 13 and a third output terminal 113, and a source of the third switch 16 is electrically connected to a second output terminal 112. A gate of the third switch 16 is electrically connected to an output terminal of a comparator 142. An inverting terminal (minus terminal) of the comparator 142 is electrically connected to a second end of a resistor R1 and a first end of a resistor R2. A second threshold voltage Vth2 (additional threshold voltage) is supplied to a non-inverting terminal (plus terminal) of the comparator 142. Preferably, the second threshold voltage Vth2 is lower than a first threshold voltage Vth1 supplied to a plus terminal of a comparator 140, but is higher than or equal to a product of the above described division ratio and a voltage necessary to turn on a third LED 23.

According to the modification 6, a controller 14 is configured to turn on the first switch 13 upon a detection voltage Vx decreasing to be lower than the first threshold voltage Vth1. Moreover, according to the modification 6, the controller 14 is configured to turn on the third switch 16 in addition to the first switch 13, upon the detection voltage Vx decreasing to be lower than the second threshold voltage Vth2. When both the first switch 13 and the third switch 16 are turned on, a lighting enabling voltage of a light source module 2 is decreased to a voltage (3.2 V) equal to a rated value of a forward voltage of a first LED 21. When the output voltage Vo exceeds the lighting enabling voltage of the light source module 2, a current flows through a first output terminal 111 of an output port 11, a first LED 21, the fourth output terminal 114, the first switch 13, and the third switch 16, in this order. Consequently, the second LED 22 electrically connected in parallel with the first switch 13 and the third LED 23 electrically connected in parallel with the third switch 16 are turned off, respectively, but the first LED 21 turned off (emits light).

In the modification 6, preferably, an external selection switch 70 is electrically connected in parallel with the first switch 13. In the case where a selection switch 70 is electrically connected in parallel with the first switch 13, when the controller 14 firstly turns on the first switch 13 while the selection switch 70 is on, only the first LED 21 may be turned on regardless of the input voltage Vin being higher than or equal to a lighting enabling voltage enabling both the first LED 21 and the second LED 22 to turn on. It is therefore preferable that the controller 14 firstly turns on the first switch 13 electrically connected in parallel with the selection switch 70 before turning on the third switch 16 when a reduction of the input voltage Vin occurs. Accordingly, the modification 6 can avoid a situation where only the first LED 21 is turned on even when the input voltage Vin is higher than or equal to the lighting enabling voltage enabling both the first LED 21 and the second LED 22 to turn on. The operator can determine that a reduction of the voltage of the battery 4 occurs when seeing that only part of the plurality of solid-state light sources of the head lamp is turned on (emit light). That is, the solid-state light source lighting device 1, the luminaire 3, the vehicle lamp 5, and the two-wheeled vehicle 6 can inform the operator of occurrence of the reduction of the voltage of the battery 4 so as to facilitate the operator to take a necessary step (such as replacement of the battery 4, for example). Furthermore, the solid-state light source lighting device 1, the luminaire 3, the vehicle lamp 5 and the two-wheeled vehicle 6 can keep the light source module 2 turning on (emitting light) with the reduced voltage of the battery 4, although the light amount therefrom may be reduced. The solid-state light source lighting device 1, the luminaire 3, the vehicle lamp 5 and the two-wheeled vehicle 6 can provide an increased safety by keeping the light source module 2 turning on.

Figure 6:
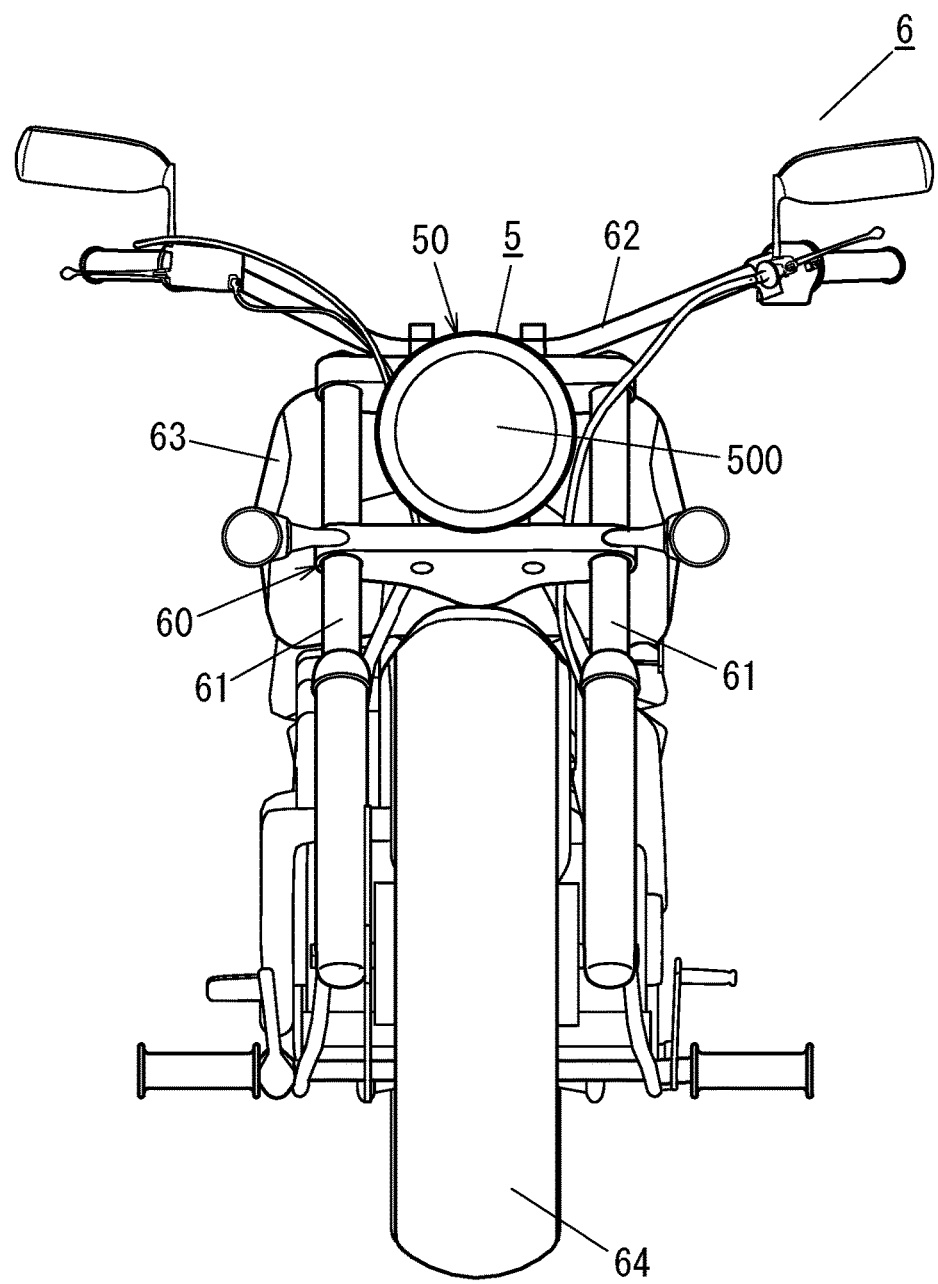
FIG. 6 a front view of a two-wheeled vehicle equipped with a vehicle lamp according to an embodiment of the present disclosure.

As shown in FIG. 6, the vehicle lamp 5 of the embodiment is a head lamp mounted on a vehicle body (frame) 60 of the two-wheeled vehicle 6 of the embodiment. The vehicle lamp 5 includes a lamp body 50. The lamp body 50 includes a body formed into a bowl shape, and a cover 500 covering an opening face of the body. The cover 500 is formed from a glass or synthetic resin providing light transmission property into a circular plate shape. The luminaire 3 is housed in the lamp body 50. The light source module 2 emits light, which passes through the cover 500 on a front face of the lamp body 50 to be emitted to a front side of the vehicle body 60.

The two-wheeled vehicle 6 includes front forks 61 mounted on a front end of the vehicle body 60, and a handle bar 62 attached on top ends of the front forks 61. The two-wheeled vehicle 6 includes a fuel tank 63 mounted on the vehicle body 60, a wheel (front wheel) 64 rotatably attached to lower ends of the front forks 61, and a wheel (rear wheel) rotatably attached to a rear end of the vehicle body 60.

As described above, a solid-state light source lighting device 1 according to a first aspect includes: an input port 10 for receiving a DC voltage (input voltage Vin); an output port 11 to which a series circuit of a plurality of solid-state light sources (first LED 21, second LED 22, third LED 23) is to be electrically connected; an adjuster 12 configured to adjust an output current to be output through the output port 11; a switch (first switch 13) to be electrically connected in parallel with at least one solid-state light source (for example, second LED 22) of the plurality of solid-state light sources; and a controller 14 configured to turn on and off the first switch 13. The controller 14 is configured to keep the first switch 13 off while the DC voltage (input voltage Vin) received through the input port 10 is higher than a threshold voltage, and keep the first switch 13 on while the input voltage (Vin) is lower than or equal to the threshold voltage. The threshold voltage is higher than or equal to a voltage necessary to turn on the plurality of solid-state light sources while the first switch 13 is off.

The solid-state light source lighting device 1 according to the first aspect can turn on at least one solid-state light source (first LED 21 and third LED 23) out of the plurality of solid-state light sources even when a reduction of the input voltage Vin occurs, despite the solid-state light source lighting device 1 does not include a voltage increase circuit provided in the related device. The solid-state light source lighting device 1 according to the first aspect can offer an advantage of capable of turning on the solid-state light source(s) (first LED 21, third LED 23) even when a reduction of the input voltage Vin occurs, with a reduced device size (compared to the related device).

The solid-state light source lighting device 1 according to a second aspect would be realized in combination with the first aspect. Preferably, the solid-state light source lighting device 1 according to the second aspect further includes an additional switch (third switch 16) electrically connected in series with the first switch 13. Preferably, a series circuit of the first switch 13 and the third switch 16 is electrically connected to the output port 11. Preferably, the third switch 13 is to be electrically connected in parallel with another at least one of the solid-state light source (third LED 23) of the plurality of solid-state light sources. Preferably, the controller 14 is configured to keep the third switch 16 off while the input voltage Vin is higher than an additional threshold voltage. Preferably, the controller 14 is configured to keep the third switch 16 on while the input voltage Vin is lower than or equal to the additional threshold voltage. The additional threshold voltage is lower than the threshold voltage, but is higher than or equal to a voltage necessary to turn on at least one solid-state light source (for example, first LED 21) of the plurality of the solid-state light sources.

The solid-state light source lighting device 1 according to the second aspect can turn on a solid-state light source (first LED 21) even when a further reduction of the input voltage Vin occurs.

The solid-state light source lighting device 1 according to a third aspect would be realized in combination with the second aspect. Preferably, in the solid-state light source lighting device 1 according to the third aspect, the switch (first switch 13) is to be electrically connected in parallel with an external selection switch 70.

With the solid-state light source lighting device 1 according to the third aspect, the first switch 13 electrically connected in parallel with the external selection switch 70 is turned on before the additional switch (third switch 16). Accordingly, the solid-state light source lighting device 1 according to the third aspect can turn on (light) as many solid-state light sources (LEDs) as possible when a reduction of the input voltage Vin occurs.

The solid-state light source lighting device 1 according to a fourth aspect would be realized in combination with the first aspect. Preferably, the solid-state light source lighting device 1 according to the fourth aspect further includes an additional switch (second switch 15) electrically connected in series with the first switch 13 to form a series circuit connected to the output port 11. Preferably, the second switch 15 is to be electrically connected in parallel with another at least one of the solid-state light source (first LED 21) of the plurality of solid-state light sources. The controller 14 is configured to, while keeping the first switch 13 on, keep turning off the second switch 15 when the output current is greater than or equal to a lower limit, and keep turning on the second switch 15 when the output current is less than the lower limit. The lower limit is smaller than a value of a current which flows when the plurality of solid-state light sources except respective solid-state light sources electrically connected in parallel with the first and second switches (13, 15) is turned on (lit) (i.e., for example, the lower limit is smaller than a value of a current which flows when the third LED 23 is turned on) while the first switch 13 is on and the second switch 15 is off.

With the solid-state light source lighting device 1 according to the fourth aspect, it is possible to turn on a solid-state light source (third LED 23) even when a further reduction of the input voltage Vin occurs.

The solid-state light source lighting device 1 according to a fifth aspect would be realized in combination with any one of the first to fourth aspects. Preferably, in the solid-state light source lighting device 1 according to the fifth aspect, the adjuster 12 includes a resistor 121 for limiting the output current.

With the solid-state light source lighting device 1 according to the fifth aspect, further downsize is possible.

The solid-state light source lighting device 1 according to a sixth aspect would be realized in combination with any one of the first to fourth aspects. Preferably, in the solid-state light source lighting device 1 according to the sixth aspect, the adjuster 12 includes a constant current circuit configured to regulate the output current to a constant current.

With the solid-state light source lighting device 1 according to the sixth aspect, it is possible to stabilize the light output quantity by driving the solid-state light source with a constant current.

The solid-state light source lighting device 1 according to a seventh aspect would be realized in combination with the sixth aspect. Preferably, in the solid-state light source lighting device 1 according to the seventh aspect, the adjuster 12 includes a step-down type switching regulator circuit.

With the solid-state light source lighting device 1 according to the seventh aspect, it is possible to stably turning on the solid-state light source even when an increase of the input voltage Vin occurs.

As described above, a luminaire 3 according to an eighth aspect includes the solid-state light source lighting device 1 according to any one of the first to seventh aspects; and the series circuit of the plurality of solid-state light sources (first LED 21, second LED 22, third LED 23) electrically connected to the output port 11 of the solid-state light source lighting device 1.

The luminaire 3 according to the eighth aspect can offer an advantage of capable of turning on the solid-state light source(s) even when a reduction of the input voltage Vin occurs, with a reduced device size (compared to the related device).

As described above, a vehicle lamp 5 according to ninth aspect includes the luminaire according to the eighth aspect, and a lamp body 50 which holds the plurality of solid-state light sources (first LED 21, second LED 22, third LED 23) and is to be mounted on a vehicle body.

The vehicle lamp 5 according to the ninth aspect can offer an advantage of capable of turning on the solid-state light source(s) even when a reduction of the input voltage Vin occurs, with a reduced device size (compared to the related device).

As described above, a two-wheeled vehicle according to tenth aspect includes the vehicle lamp 5 according to the ninth aspect, and a vehicle body 60 on which the lamp body 50 of the vehicle lamp 5 is mounted.

The two-wheeled vehicle 6 according to the tenth aspect can offer an advantage of capable of turning on the solid-state light source(s) even when a reduction of the input voltage Vin occurs, with a reduced device size (compared to the related device).

A solid-state light source lighting device 1 according to an eleventh aspect includes: an input port 10 for receiving a DC voltage (input voltage Vin); an output port 11 to which a series circuit of a plurality of solid-state light sources (first LED 21, second LED 22, third LED 23) is to be electrically connected; an adjuster 12 configured to adjust an output current to be output through the output port 11; at least one switch (e.g., first switch 13) to be electrically connected in parallel with a corresponding at least one solid-state light source (e.g., second LED 22) of the plurality of solid-state light sources; and a controller 14 configured to turn on and off the at least one switch as a function of a value of the DC voltage, so as selectively to cause the output current though the output port 11 to bypass or not bypass the corresponding at least one solid-state light source of the plurality of solid-state light sources.

The solid-state light source lighting device 1 according to a twelfth aspect would be realized in combination with the eleventh aspect. Preferably, the solid-state light source lighting device 1 according to the twelfth aspect includes a plurality of switches (second switch 15, first switch 13, third switch 16) each to be electrically connected in parallel with a corresponding at least one solid-state light source (first LED 21, second LED 22, third LED 23). Preferably, the controller 14 is configured to turn on and off the plurality of switches at respective different values of the DC voltage.

The solid-state light source lighting device 1 according to a thirteenth aspect would be realized in combination with the twelfth aspect. Preferably, in the solid-state light source lighting device 1 according to the thirteenth aspect, as the value of the DC voltage decreases, the controller 14 is configured to turn on additional ones of the plurality of switches so as to increase a number of the plurality of solid-state light sources which are bypassed by the output current through the output port.

The solid-state light source lighting device 1 according to a fourteenth aspect would be realized in combination with any one of the eleventh to thirteenth aspects. Preferably, in the solid-state light source lighting device 1 according to the fourteenth aspect, the adjuster 12 is configured to limit or regulate the output current. Preferably, the solid-state light source lighting device 1 does not include a voltage regulator to regulate the DC voltage input to the input port 10.

The solid-state light source lighting device 1 according to a fifteenth aspect would be realized in combination with the fourteenth aspect. Preferably, in the solid-state light source lighting device 1 according to the fifteenth aspect, the adjuster 12 includes a resistor for limiting the output current.

The solid-state light source lighting device 1 according to a sixteenth aspect would be realized in combination with the fourteenth aspect. Preferably, in the solid-state light source lighting device 1 according to the sixteenth aspect, the adjuster 12 includes a constant current circuit configured to regulate the output current to a constant current.

The solid-state light source lighting device 1 according to a seventeenth aspect would be realized in combination with the fourteenth aspect. Preferably, in the solid-state light source lighting device 1 according to the seventeenth aspect, the adjuster 12 includes a step-down type switching regulator circuit.

A luminaire 3 according to the eighteenth aspect includes the solid-state light source lighting device 1 according to any one of the eleventh to seventeenth aspects, and the series circuit of the plurality of solid-state light sources (first LED 21, second LED 22, third LED 23) electrically connected to the output port 11 of the solid-state light source lighting device 1.

The luminaire 3 according to a nineteenth aspect would be realized in combination with the eighteenth aspect. Preferably, in the luminaire 3 according to the nineteenth aspect, the controller 14 is configured to turn on and off the at least one switch as a function of a value of the DC voltage in order that the DC voltage remains sufficient to light at least some of the plurality of solid-state light sources by virtue of the output current bypassing other of the plurality of solid-state light sources.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A solid-state light source lighting device, comprising:
an input port for receiving a DC voltage;
an output port to which a series circuit of a plurality of solid-state light sources is to be electrically connected;
an adjuster configured to adjust an output current to be output through the output port;
a switch to be electrically connected in parallel with at least one solid-state light source of the plurality of solid-state light sources;
an additional switch electrically connected in series with the switch; and
a controller configured to turn on and off the switch, wherein:
the additional switch is electrically connected in parallel with another at least one of the solid-state light source of the plurality of solid-state light sources,
a series circuit of the switch and the additional switch is electrically connected to the output port,
the controller is configured to
keep the switch off while the DC voltage received through the input port is higher than a threshold voltage,
keep the switch on while the DC voltage is lower than or equal to the threshold voltage,
keep the additional switch off while the DC voltage is higher than an additional threshold voltage, and
keep the additional switch on while the DC voltage is lower than or equal to the additional threshold voltage,
the threshold voltage is higher than or equal to a voltage necessary to turn on the plurality of solid-state light sources while the switch is off, and
the additional threshold voltage is lower than the threshold voltage, but is higher than or equal to a voltage necessary to turn on at least one solid-state light source of the plurality of the solid-state light sources.

2. The solid-state light source lighting device of claim 1, wherein
the switch is to be electrically connected in parallel with an external selection switch.

3. The solid-state light source lighting device of claim 1, wherein the adjuster includes a resistor for limiting the output current.

4. The solid-state light source lighting device of claim 1, wherein
the adjuster includes a constant current circuit configured to regulate the output current to a constant current.

5. The solid-state light source lighting device of claim 4, wherein the adjuster includes a step-down type switching regulator circuit.

6. A luminaire, comprising:
the solid-state light source lighting device of claim 1; and
the series circuit of the plurality of solid-state light sources electrically connected to the output port of the solid-state light source lighting device.

7. A vehicle lamp, comprising:
the luminaire of claim 6; and
a lamp body which holds the plurality of solid-state light sources and is to be mounted on a vehicle body.

8. A two-wheeled vehicle, comprising:
the vehicle lamp of claim 7; and
a vehicle body on which the lamp body of the vehicle lamp is mounted.

9. A solid-state light source lighting device, comprising:
an input port for receiving a DC voltage;
an output port to which a series circuit of a plurality of solid-state light sources is to be electrically connected;
an adjuster configured to adjust an output current to be output through the output port;
a switch to be electrically connected in parallel with at least one solid-state light source of the plurality of solid-state light sources;
an additional switch electrically connected in series with the switch to form a series circuit connected to the output port; and
a controller configured to turn on and off the switch, wherein
the additional switch is electrically connected in parallel with another at least one of the solid-state light source of the plurality of solid-state light sources,
the controller is configured to
keep the switch off while the DC voltage received through the input port is higher than a threshold voltage,
keep the switch on while the DC voltage is lower than or equal to the threshold voltage,
while keeping the switch on, keep turning off the additional switch when the output current is greater than or equal to a lower limit, and
keep turning on the additional switch when the output current is less than the lower limit,
the threshold voltage is higher than or equal to a voltage necessary to turn on the plurality of solid-state light sources while the switch is off, and
the lower limit is smaller than a value of a current which flows when the plurality of solid-state light sources except respective solid-state light sources electrically connected in parallel with the switch and the additional switch is turned on while the switch is on and the additional switch is off.

10. A solid-state light source lighting device, comprising:
an input port for receiving a DC voltage;
an output port to which a series circuit of a plurality of solid-state light sources is to be electrically connected;
an adjuster configured to adjust an output current to be output through the output port;
a plurality of switches each to be electrically connected in parallel with a corresponding at least one solid-state light source of the plurality of solid-state light sources; and
a controller configured to turn on and off the plurality of switches as a function of a value at respective different values of the DC voltage, so as selectively to cause the output current though the output port to bypass or not bypass the corresponding at least one solid-state light source of the plurality of solid-state light sources.

11. The solid-state light source lighting device of claim 10,
wherein as the value of the DC voltage decreases,
the controller is configured to turn on additional ones of the plurality of switches so as to increase a number of the plurality of solid-state light sources which are bypassed by the output current through the output port.

12. The solid-state light source lighting device of claim 10,
wherein
the adjuster is configured to limit or regulate the output current, and the solid-state light source lighting device does not include a voltage regulator to regulate the DC voltage input to the input port.

13. The solid-state light source lighting device of claim 12,
wherein the adjuster includes a resistor for limiting the output current.

14. The solid-state light source lighting device of claim 12,
wherein
the adjuster includes a constant current circuit configured to regulate the output current to a constant current.

15. The solid-state light source lighting device of claim 14,
wherein the adjuster includes a step-down type switching regulator circuit.

16. A luminaire, comprising:
the solid-state light source lighting device of claim 10, and
the series circuit of the plurality of solid-state light sources electrically connected to the output port of the solid-state light source lighting device.

17. The luminaire of claim 16,
wherein the controller is configured to turn on and off the at least one switch as a function of a value of the DC voltage in order that the DC voltage remains sufficient to light at least some of the plurality of solid-state light sources by virtue of the output current bypassing other of the plurality of solid-state light sources.

* * * * *